United States Patent [19]

Johnston

[11] 3,880,182
[45] Apr. 29, 1975

[54] UNIVERSAL VALVE SYSTEM FOR BEER KEGS AND THE LIKE

[76] Inventor: Mack S. Johnston, 1065 Lomita Blvd. No. 220, Harbor City, Calif. 92626

[22] Filed: July 10, 1974

[21] Appl. No.: 487,358

Related U.S. Application Data

[63] Continuation-in-part of Ser. No. 389,836, Aug. 20, 1973, abandoned.

[52] U.S. Cl.............. 137/212; 222/148; 222/400.7; 137/588
[51] Int. Cl...................... B65d 83/14; F16l 55/10
[58] Field of Search.................. 137/212, 322, 588; 222/148, 400.7; 141/113, 302, 309

[56] References Cited
UNITED STATES PATENTS

| | | | |
|---|---|---|---|
| 3,596,809 | 8/1971 | Taubenheim | 137/212 X |
| 3,753,445 | 8/1973 | Johnston | 222/148 X |

Primary Examiner—Alan Cohan
Attorney, Agent, or Firm—Wills, Green & Mueth

[57] ABSTRACT

A valve body containing liquid and gas passageways with normally closed valves, is positioned in a generally cylindrical housing or cage which has one end thereof received in an opening contained in a wall of a keg or the like, said valve body being movable in the housing or cage between a closed position at said keg opening and an open position spaced therefrom. The cage or housing adjacent the keg opening contains a plurality of openings for the admission of liquid into the keg through the keg opening and said housing openings when the valve body is in the open position. Interengaging detent means are provided between the valve body and the housing, releasably maintaining the valve body is the closed position. A filling assembly is also provided for simultaneously filling the keg with liquid through the openings in the housing or cage and for venting air from the keg through a siphon tube in communication with the liquid passageway in the valve body.

22 Claims, 14 Drawing Figures

3,880,182

UNIVERSAL VALVE SYSTEM FOR BEER KEGS AND THE LIKE

CROSS-REFERENCE TO RELATED APPLICATIONS

This application is a continuation-in-part of application Ser. No. 389,836 filed Aug. 20, 1973, now abandoned, and has subject-matter relationship with application Ser. No. 222,910, filed Feb. 2, 1972, now U.S. Pat. No. 3,753,445.

BACKGROUND AND SUMMARY OF THE INVENTION

The present invention relates generally to the liquid storage and dispensing art, and more particularly to a novel universal valve system for beer kegs and the like, and a novel liquid filling assembly therefor.

For many years, the prevailing draft system for dispensing beer from kegs required a wooden cork which sealed an opening in one end of the keg, which cork was removed by the bartender who then inserted into the opening an elongated tap rod assembly which had a siphoning device associated therewith. Means were provided to inject compressed air or carbon dioxide into the keg through the tap rod assembly, whereby the beer was driven out of the keg through the siphoning device to a spigot or faucet which controlled the flow of beer from the keg.

After all of the available beer had been withdrawn from the keg, the bartender would then remove the tap rod assembly and siphoning device from the spent keg and repeat the process with a full keg. Inasmuch as the same tap rod assembly and siphoning device were used over and over again, it was necessary for the bartender to frequently clean the unit in an effort to remove old yeast deposits and bacteria so as to avoid contaminating the beer in the fresh barrel.

Another problem with the aforementioned draft system was that the spent or empty kegs had an opening in the end thereof from which the cork had been removed, which opening permitted all kinds of foreign matter and things to enter the keg. Consequently, the cleaning of these kegs at the brewery prior to refilling was a laborious and costly process.

Also, for many years and up to the present time, substantially all commercial beer kegs are filled with beer through an opening in the side wall, which opening is subsequently closed with a wooden bung or plug. This presents several problems. Prior to washing and refilling the keg with beer, the old wooden plug or bung is removed with a special screw augar which cuts into the bung and pulls it out of the opening. However, often times the bung will split into pieces and such pieces and chips will fall into the keg, thereby requiring special efforts to remove the pieces and chips and a further inspection to make certain that all have been removed.

The keg then passes to the washing rack where it is washed and inspected and then turned on its side with the bung-hole directed downwardly, to permit all water and caustic cleaner to drain from the keg.

When the keg has been washed and is in transit to the racking room where the keg is to be filled with beer, the bunghole remains open, with the possibility that foreign matter might fall into the keg and contaminate the beer which is subsequently introduced into the keg.

At the filling station, it is again necessary to change the position of the keg in order to have the bunghole at the top, to permit the keg to be filled with beer.

After a keg has been filled with beer by means of a filling rod which is inserted through the aforementioned bunghole, the hole is closed with a wooden plug or bung which is usually manually driven into place with a sledge hammer. If the first bung does not effectly close the opening, it is not uncommon to place a second bung on top of the first one, and to drive the first bung into the keg. There might be dirt and bacteria on the outer face of the first bung where the sledge hammer struck it, and this could also contaminate the beer.

Obviously, the manual removal of a bung from an empty keg, with the accompanying inspection to make certain that all chips have been removed, the washing and draining of the keg, the turning of the keg and the filling of it with beer, and the manual driving of a bung into the hole after the keg has been filled with beer .. . are very time consuming operations and materially add to the cost of a keg of beer. At the present time, there are from eight to ten steps in debunging, cleaning, filling and sealing of a keg of beer, with most modern breweries having a capacity of from about 160 to 350 kegs per hour.

Also, an additional major problem occurs after the bung has been driven into the opening and the keg has been removed from the racking room, because it is expected that anywhere from 0.5 percent to 1.0 percent of the kegs will leak around the bung. If such "leakers" are detected in the storage room, it is necessary to remove and replace the old bung, but many such "leakers" are not detected in the storage room or they begin to leak during transit, with the result that they are rejected at the tavern, and must be returned to the brewery and the contents dumped.

Being familiar with the aforementioned problems, I invented various beer tapping assemblies which included a keg adapter mounted in the dispensing opening in the end wall of the keg and which included gas and liquid passageways containing valves which were yieldably biased toward the closed position and which remained closed to prevent the escape of the liquid contained within the keg, unless and until a tapper was engaged with the keg adapter and actuated to cause a tap rod to machanically unseat the liquid valve and to open the gas valves by means of gas pressure from an outside source. Although this general concept constitutes a considerable and valuable advance over the prior art, it has the disadvantage that different keg adpters must be produced for kegs with different sizes of dispensing openings, as for example the "Golden Gate" keg which has a one and one-half inch dispensing opening, and the "Peerless" keg which has a three-fourths of an inch dispensing opening.

To overcome the problem of filling a keg through the bunghole and subsequently sealing the filling opening with a wooden bung with its attendant problems, I also invented various keg adapters which can be used for washing and filling the keg, as well as being used for dispensing liquid from the keg using my aformentioned tapper. Here again, although these novel keg adapters constitute a radical departure from the teachings of the prior art and are very satisfactory, they employ a coiled spring for yieldably biasing the valve body toward the closed position, which spring causes a slight problem from the standpoint of ease of cleaning that portion of the keg adapter which extends into the interior of the keg. Also there is a possibility that the spring may become "set" or become weakened from prolonged usage.

With the aforementioned limited deficiencies of my prior developments in mind, and continuing to seek further advances in the art, it is an object of the present invention to do away with separate filling and dispensing openings in a beer keg or the like. More particularly, it is an object to provide a universal valve system which can be used for washing, filling and liquid-dispensing purposes. Specifically, it is an object to provide such a valve system which will have universal utility, i.e., which will obviate the usage of different kegs with different types of dispensing openings.

Another object is to provide such a novel valve system which provides for the washing and filling of kegs with the valve assembly at the lowermost end of the keg during the washing and filling operation, whereby the number of stations required for washing, inspecting and filling are greatly reduced.

A further object is to provide such a novel valve system which contains relatively few parts of simple design, whereby the assembly is easy to clean and maintain free of bacteria. More particularly, it is an object to provide such a system which does not contain any internal springs.

Yet another object is to provide a novel universal valve system which includes a valve body having liquid and gas passageways therethrough and movable between an open and closed position relative to a filling opening, which valve body is securely retained in the closed position during shipping and when liquid is being dispensed therefrom. More particularly, it is an object to provide such an assembly in which the valve body is mechanically but releasably fastened in the closed position.

Another object is to provide a novel filling attachment for use with a said novel universal valve system, whereby the beer keg or the like containing said system can be easily and quickly filled with liquid from the lowermost end of the keg and without a separate vent opening in the keg.

I have discovered that the foregoing objects and advantages are achieved with a novel universal valve system which includes a generally cylindrical cage or housing having one end received in the keg opening, the other end of the cage or housing extending into the interior of the keg; an internal sealing surface on said cage or housing adjacent the keg opening; a valve body including a support member, positioned in said housing for longitudinal movement between a closed position in which the support member is in engagement with the internal sealing surface and an open positioned in which the support member is spaced from said sealing surface; a plurality of openings in the cage or housing within the interior of the keg; which openings are unobstructed to provide for the flow of liquid through the keg opening and the cage or housing openings and into the interior of the keg when the valve body is in the open position; and detent means releasably maintaining the valve body in the closed position. A filling attachment is also provided, which includes a filling pipe for sealing engagement with the keg opening, and means associated therewith for moving the valve body to the open position and for venting the air from the top of the keg through said filling attachment while liquid is flowing into the keg through the cage or housing.

DESCRIPTION OF THE PREFERRED EMBODIMENTS

Although the universal valve system of the subject invention can be used with kegs for storing and dispensing various types of liquids, it is especially suitable for use with kegs which are filled with draft beer, and it will be so described.

Figure 1:
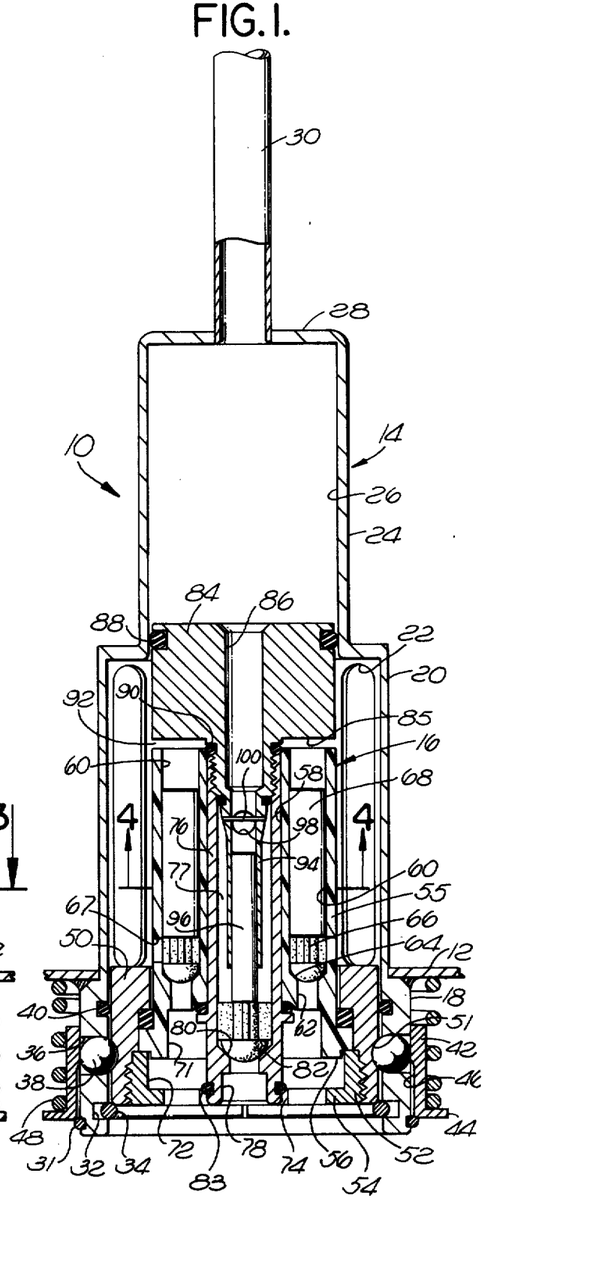
FIG. 1 is a vertical sectional view of one form of a novel universal valve system constructed in accordance with the teachings of the present invention, shown installed in the wall of a keg and with the valve body in the closed or shipping position.

Referring to the drawings more particularly by reference numerals, specifically FIG. 1, the number 10 indicates generally one form of a novel universal valve system embodying the teachings of the present invention, shown installed in the end wall 12 of a keg, and which includes a tubular housing 14 which extends into the interior of the keg, and a valve assembly 16 which is mounted in said housing or longitudinal movement therein between an open and a closed position.

The tubular housing 14 is fastened in an opening which is preferably in the end wall of the keg, as by welding, and includes an outer hub portion 18, an outer housing portion 20 which contains a plurality of circumferentially spaced, longitudinally extending slots 22, and an inner housing portion 24 of reduced diameter which has an inner wall surface 26 and which terminates in an end wall 28. The end wall contains an opening which receives and supports the inner end of a siphon tube 30.

Returning to a consideration of the outer hub portion 18, it includes an outer annular groove which receives a first metal split ring retainer 31, an inner annular groove 32 which receives a second metal split ring retainer 34, a plurality of circumferentially spaced, radial openings 36 in which are positioned ball detents 38, and another annular groove which supports a sealing O-ring 40.

Positioned about the outer hub portion 18 in sliding contact therewith is an annular retainer sleeve 42 which has an outer flange portion 44 and an inner annular recess 46 for a purpose to appear. A coiled spring 48 is positioned around the sleeve 42, with one end thereof bearing against the keg wall 12 and the other against the flange portion 44, whereby the retainer sleeve 42 is yieldably biased toward the outward position with the outward end thereof restrained by the first split ring retainer 31.

The valve assembly 16 which is movable longitudinally within the housing 14, includes an annular support member 50 which contains a groove 51 of arcuate cross-section in the outer peripheral face thereof to receive the ball detents 38, and to which is threaded an inner annular retaining member 52, the latter containing a flange portion 54.

The support member 50 and the retaining member 52 support therebetween, a valve actuator body 55 preferably molded from a plastic material which can withstand caustic cleaning fluids, and which includes an end wall 56, an end cavity 57, a central passageway, and diametrically opposed gas passageways 60, each of which passageways includes an inlet port 62, a gas valve seat 64, a gas valve member 66, a gas port 67 and a permanent magnet valve actuator 68. Embedded in the valve actuator body adjacent the actuator megnets 68 are sets of permanent magnets 70 (FIGS. 4 and 5) which yieldably bias the actuators 68 and their associated gas valve members 66 toward the closed positiln.

The construction and operation of these magnetic valve actuators are described in my copending application Ser. No. 385,358, filed Aug. 8, 1973, now Pat. No. 3,836,053 which description is incorporated herein by reference.

The end wall 56 of the valve actuator body and the flange portion 54 of the retaining ring define an annular groove 72 (FIG. 1) which contains diametrically opposed access slots 74 for receiving the hook portions of a tapper assembly which is also shown and described in the aforementioned copending application. As previously mentioned, all of the valve assemblies which I have invented for use with the "Golden Gate" keg, the "Peerless" keg, as well as the present universal construction, are constructed and arranged to be used with the aforementioned tapper of copending application Ser. No. 385,358. Thus, regardless of the type of beer keg which is received in a tavern or restaurant, my new tapper unit can be utilized for operative engagement with the keg adapter valve, whereby to introduce compressed gas into the keg and to dispense the beer therefrom.

Returning to a consideration of the valve actuator body 55, extending through the central passageway 58 thereof is a tubular member 76 which has a liquid passageway 77 therethrough and which includes a port 78 at the other end, a liquid passage valve seat 80 adjacent said port, and a liquid valve member 82 for engagement with the valve seat. An O-ring 83 is received in an external annular groove at the outer end of said tubular member, for a purpose to appear.

Figure 2:
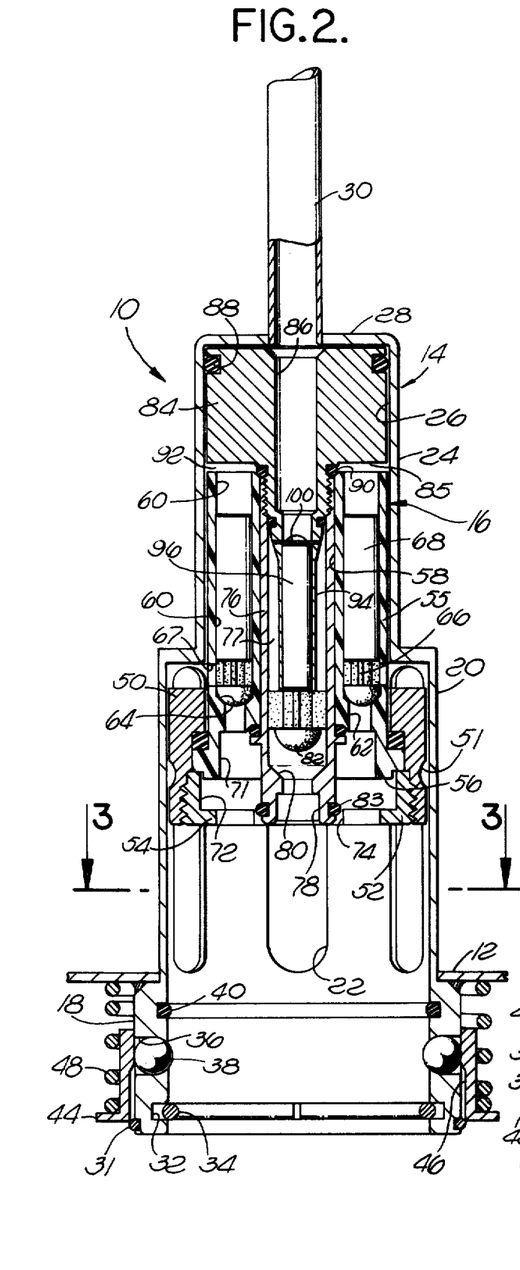
FIG. 2 is a vertical sectional view similar to FIG. 1, but with the valve body in the open position as when washing fluid is being introduced into the interior of the keg, but for clarity omitting the filling attachment.

The inner end of the tubular member 76 contains internal threads which receive and support a piston member 84 having an outer face 85 and which also has a liquid passageway 86 therethrough. The inner end of the piston member 84 contains an external annular groove which supports an O-ring 88 which is in sliding sealing engagement with the inner wall 26 of the inner housing portion. An O-ring 90 is positioned at the juncture of the piston member with the inner end of the tubular member 76 and the inner end of the valve actuator body 55. As shown in FIGS. 1 and 2, there is a passageway 92 between the outer face 85 of the piston member and the inner end of the valve actuator body, which passageway is in communication with the gas passageways which slidably receive the actuator magnet 68. This permits the egress of any fluid trapped between the inner end of the actuator 68 and the face 85, as when the actuator is being moved inwardly under the pressure of compressed gas or incoming washing fluid.

Extending outwardly from the inner face 85 of the piston member and into the liquid passageway 77 within the tubular member 76, is a tubular portion 94 which forms an extension of the liquid passageway 86, the outer end of which tubular portion slidably receives a permanent magnet liquid valve actuator 96 which is in engagement with the liquid valve member 82. As shown in FIGS. 1 and 2, the diameter of the tubular portion 94 is less then the inner diameter of the tubular member 76, to provide a liquid passageway therebetween.

Diametrically opposed ports 98 are formed in the tubular portion 94 to provide for the flow of liquid through the passageways 86 and 77, and a pin 100 extends across the tubular portion adjacent said ports to limit the inward movement of the actuator 96.

It will be noted in FIG. 1 that when the coiled spring 48 is extended, the retainer sleeve 42 holds the ball detents 38 in the annular groove 36, whereby the valve assembly 16 is securely but releasably locked in position. And, with the actuator 96 yieldably biasing the liquid valve member 82 against the liquid valve seat 80, and the actuator members 68 yieldably biasing the gas valve members 66 against the gas valve 64, the keg is securely closed, whether it is empty or filled with a liquid such as beer. If there is beer in the keg, there is a filling pressure of from about 9 to about 34 pounds per square inch, which further aids in maintaining the various valve members in the closed position.

However, when the tapper of my copending application Serial No. 385,358 is engaged with the groove 72, and the tapping arm actuated, the liquid valve member 82 is mechanically moved away from its valve seat 80, and the gas inlet ports 62 are placed in communication with a source of compressed gas (not shown), whereby the gas valve members 66 are forced away from their associated valve seats 64, to permit the gas to flow through the inlet ports 62, past the valve seats 64, through the gas ports 67, through the elongated apertures 22, and into the interior of the keg. The gas then forces the beer in the keg through the siphon tube 30, into the inner housing portion 24, through the liquid passageway 86, the ports 98, the passageway 77 and past the open valve seat 80 and into the ports 78 and the liquid dispensing passageway of the tapper.

Figures 3, 4, 5, 6, 7, 8, 9:
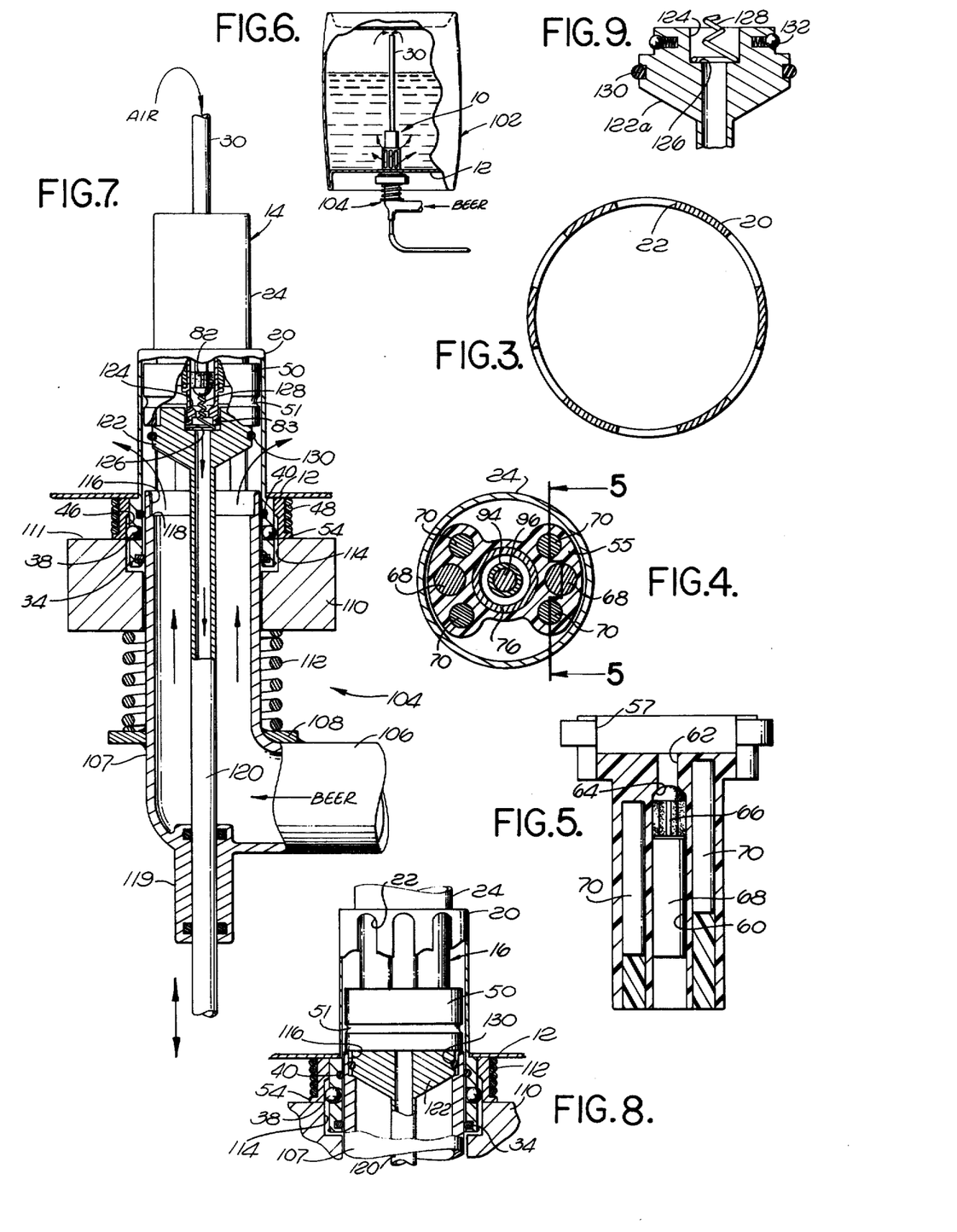
FIG. 3 is a horizontal, sectional view taken on the line 3—3 in FIG. 2.
FIG. 4 is a horizontal, sectional view taken on the line 4—4 in FIG. 1.
FIG. 5 is a vertical, sectional view taken on the line 5—5 in FIG. 4, but showing only the valve body.
FIG. 6 is an elevational view of a beer keg, partially cut-away, containing one form of a universal valve system constructed in accordance with the teachings of the present invention, with a beer-filling attachment in place and filling the keg with beer.
FIG. 7 is an enlarged, fragmentary, vertical sectional view of the assembly and beer-filling attachment of FIG. 6.
FIG. 8 is a fragmentary, elevational view of a portion of the valve assembly and the filling attachment of FIG. 7 but with the head of the filling attachment in the off position, as it would appear prior to the beginning of the filling operation or at the termination thereof.
FIG. 9 is an enlarged, vertical sectional view of a modified form of filling head.

FIGS. 6, 7 and 8, show one form of my novel universal valve system, installed in the end wall 12 of a keg 102, and a beer-filling assembly 104 for simultaneously filling the keg with beer from the bottom and for venting the air from the top of the keg through the siphon tube 30.

The beer filling assembly 104 (FIG. 7) includes an L-shaped beer filling pipe 106 which has a vertically extending inlet portion 107 to which is fastened an external flange member 108. Slidably mounted on the upper end of the inlet portion is a valve release block 110 with an upper face 111. Positioned about the inlet portion of the pipe and between said block and the flange member 108 is a coiled spring 112 which urges said block in the upward direction to engage the flange portion 54 and compress the spring 48. The upper end of the block 110 contains a recess 114 to receive the outer hub portion 18 of the tubular housing 14. The upper end of the inlet portion 107 of the filling pipe contains an annular inner recess with an inner wall 116 and a shoulder 118.

Depending from the beer filling pipe 106 as an extension of the filling portion 107, is a hub portion 119 which slidably supports a rigid air vent tube 120 which is movable between a filling position (FIG. 7) and a closed position (FIG. 8). The vent tube 120 has a filling head 122 at the upper end thereof, the latter including a cylindrical recess in its upper face which is in communication with the passageway through the tube 120, and which includes a side wall 124 and a bottom wall 126. As shown in FIG. 7, the side wall 124 is in sealing engagement with the O-ring 83 and the bottom wall 126 supports a conical coiled spring 128 which engages and opens the liquid valve member 82.

The bottom portion of the filling head 122 contains an externally-mounted O-ring 130 which is adapted to engage the inner wall 116 (FIG. 8) at the upper end of the filling portion of the beer pipe 106 when the vent tube is in the closed position.

A modified form of filling head 122a is shown in FIG. 9, which differs from the original filling head 122 only in that it further contains diametrically opposed, spring-biased ball detents 132, for a purpose to appear.

To use the filling assembly 104 for filling the keg 102 with beer, the air vent tube 120 is retracted so that the filling head 122 is in the closed position as shown in FIG. 8, and the upper end of the inlet portion 107 of the filling pipe is placed against the split-ring retainer 34 and forced upwardly, thereby opening the ring and causing it to move outwardly in the annular groove 32. Simultaneously, the upper face 111 of the valve release block 110 engages the flange portion 54 of the retainer sleeve 42 and urges the retainer sleeve upwardly against the action of the coiled spring 48, until the sleeve engages the wall 12 of the keg. This upward movement of the retainer sleeve brings the inner annular recess 46 into alignment with the ball detents 38, thereby permitting them to move outwardly as the upper end of the inlet portion of the beer filling pipe moves upwardly.

As shown in FIG. 7, the upper end of the inlet portion 107 continues to move upwardly past the ball detents 38 and the O-ring 40, to the position shown in FIG. 8, with the O-ring 130 of the filling head in engagement with the wall 116. In this position, the flow of beer is stopped at the filling head 112 and cannot enter the keg.

However, when the vent tube 120 is moved upwardly (FIG. 7) by automatic means (not shown), the filling head 122 moves the valve assembly 16 to the open position, whereby beer can flow into the keg through the elongated slots 22 contained in the outer housing portion 20. At the same time, the coiled spring 128 engages the liquid valve member 82 and moves it away from its seat 80, thereby opening the liquid passageway 86 and 77. Accordingly, as the beer flows upwardly into the keg, air trapped in the top of the keg flows downwardly through the siphon tube 30, through the liquid passageway 86 (FIG. 2), port 98, passageway 77, and past the valve seat 124 and into the passageway contained in the vent tube 20, and thence to an inverted U-shaped clear glass tube (not shown), whereby the operator can determine when the keg is filled with beer by beer appearing in the glass portion, instead of air.

The air vent tube 120 and the filling head 122 are then pulled downwardly to the position shown in FIG. 8, whereby the flow of beer is terminated by reason of the O-ring 130 seating against the inner wall 116. The inlet portion 107 of the filling pipe 106 can then be pulled downwardly, thereby causing the valve assembly 16 to move to the closed position because of the weight of the piston member 84 and the beer pressure on the inner end thereof. If desired, the modified filling head 122a of FIG. 9 can be used, in which the ball detents 132 are received in the annular groove 72, so as to physically pull the valve assembly 68 in the downward direction as the vent tube 120 is pulled downwardly.

As the upper end of the inlet portion 107 of the filling pipe is being pulled downwardly, the O-ring 40 continues to remain in sealing engagement with the outer surface of the filling portion 107 (FIG. 7) until the outer surface of the support member 50 engages the O-ring 40, thereby preventing beer from leaking from the keg.

When the upper end of the filling portion 107 passes the split ring 34, the latter returns to a closed position, thereby limiting the downward movement of the annular support member 50, and, as the valve release block 110 moves downwardly, the coiled spring 48 urges the retainer sleeve 42 downwardly, causing the ball detents 38 to be cammed inwardly and into engagement with the groove 51, thereby securing the valve assembly in the closed position.

Although the filling pipe 106 and vent tube 120 have been shown and described as they operate in filling the keg 102 with beer, a similar arrangement can be used for filling the keg with a cleaning fluid. For cleaning the keg, I prefer to use a similar filling pipe 106/107 with a like valve release block 110, but I omit the vent tube 120 and the filling head 122, and, in place thereof use a shaft and upper fitting which merely move the valve assembly to the open position without obstructing the liquid and gas passageways so as to permit the incoming cleaning fluid to flow through and around the various valve members and their actuators.

Although the washing, drying and beer filling operations can be performed with the keg 102 at a single station, I prefer to use at least three stations, with the keg 102 being filled with cleaning fluid and drained at a first station, then moved to a second station where the valve assembly 16 is moved to an open position and the interior of the keg air-dried, at which second station the interior of the keg can be inspected for cleanliness. The keg then passes to a third station where it is filled with beer in the manner illustrated in FIGS. 7 and 8, and as previously described. If desired, additional stations between the washing and drying stations can be provided to inject steam and follow-up with a cold water rinse.

Referring to FIGS. 10 - 13, the number 140 indicates a modified form of universal valve system constructed in accordance with the teachings of the present invention, which is more economical to manufacture than the form shown in FIGS. 1 - 5, primarily because it has fewer parts, and major parts which are of a simplified configuration.

Also, in the first form shown in FIGS. 1 - 5, the housing is permanently fastened in an end wall of a beer keg or the like, whereas, the modified form of valve system is removably fastened in the keg so that it can be easily removed for inspection and repair, if necessary.

Thus, the end wall 142 of a keg (FIG. 10) contains an opening 144 in which is mounted an externally threaded ring 146, as by welding.

The valve system 140 includes a generally cylindrical cage assembly 148 which contains an annular sealing member 150 adjacent the keg wall end thereof, which member has an inner wall surface 152 and a plurality (preferably 3) of circumferentially spaced openings 154 which receive ball detents 156 for a purpose to appear.

Fastened to the outer peripheral surface of the sealing member 150 is an internally threaded, mounting ring 158 for removable engagement with the ring 146, and which includes an end face 160. If desired, an O-ring 162 can be positioned between the ring 146 and the outer wall of the annular member 150, to assure a fluid seal.

Threadedly fastened to the inner end surface of the sealing member 150 are a plurality of circumferentially spaced, axially-extending rods 164 which support a circular plate 166 at the inner ends thereof. The plate 166 contains a circular opening 168 at the center thereof, in which is fastened the enlarged end of a siphon tube 170, the outer end of the siphon tube extending into the interior of the keg as shown generally at 30 in FIG. 6.

Supported within the cage assembly for axially movement relative to the sealing number 150, is a valve assembly 172 which includes a moulded plastic valve body 174 containing a central liquid passageway 176 (FIG. 13) and two diametrically opposed gas passageways 178, each of which is provided with valve member . . . all of the same general configuration as in the valve body 55 (FIG. 4) of the first embodiment.

Fastened to the outer end of the valve body 174 is a disc-like support member 180 which contains an outer external groove 182 for receiving the ball detents 156, and an inner external groove 183 for receiving an O-ring 184 for sliding sealing engagement with the inner wall surface 152 of the sealing member 150.

The outer end of a tubular connector 186 is threadedly fastened to the inner end of the valve body 174 (FIG. 10) with an O-ring 188 therebetween . . . said outer end of the tubular connector being in communication with the liquid passageway 176. The inner end of the tubular connector 186 is received in the enlarged portion 170 of the siphon tube, and contains an external groove 190 which receives an O-ring 192, the latter being in sliding sealing engagement with the inner surface of the enlarged portion 170.

The outer end of the tubular connector 186 contains an external flange 194 which provides a groove adjacent to the O-ring 188 for receiving and supporting a disc member 196 to which is fastened two diametrically opposed, axially extending, guide pins 198. The inner ends of the guide pins 198 are slidably received in diametrically opposed openings 200 contained in the plate 166. External grooves are provided at the inner ends of the guide pins 198 for receiving split-rings 202, which rings limit the outward movement of the guide pins and the valve assembly 172 . . . as will be described more fully hereinafter.

Figures 10, 11, 12, 13, 14:
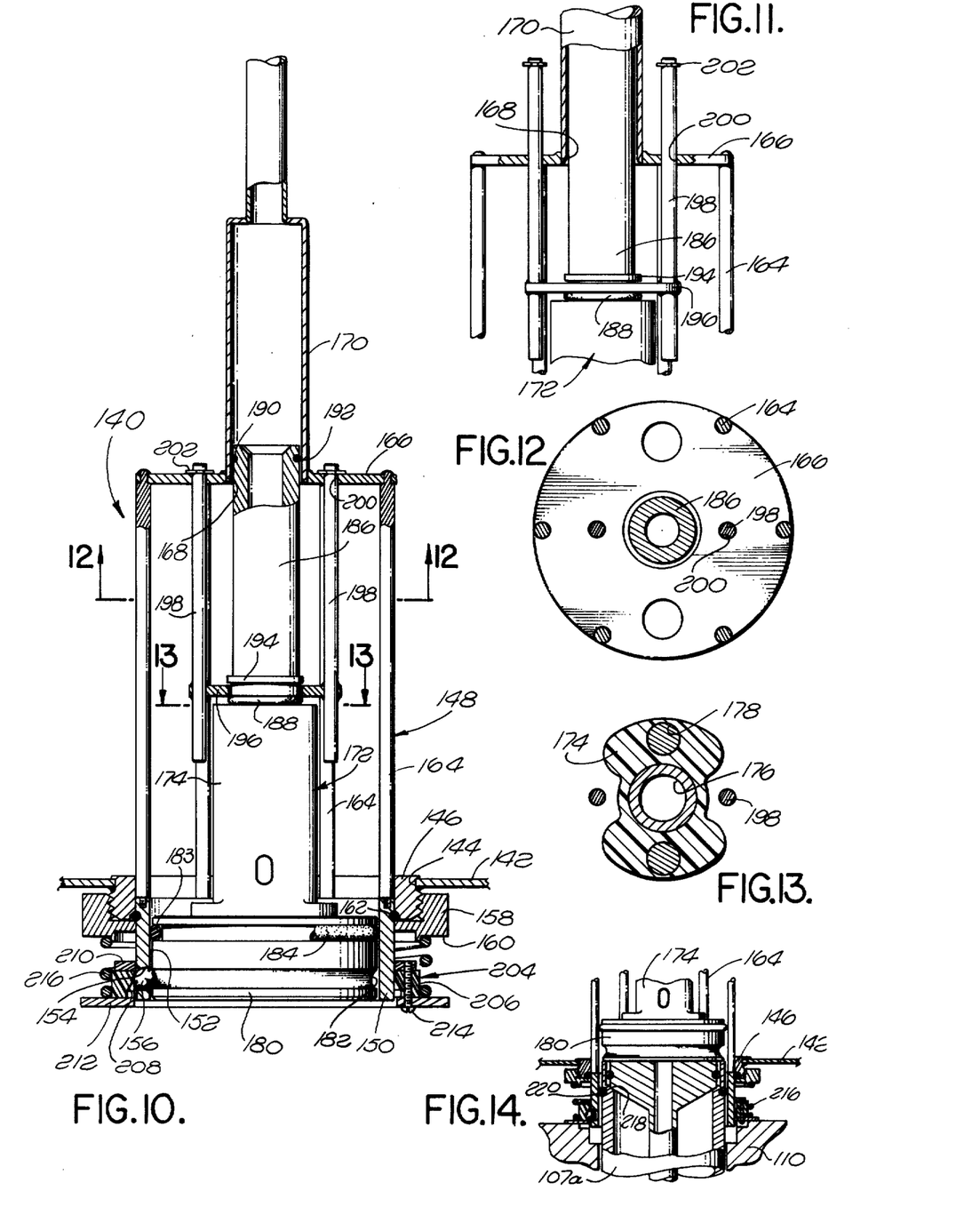
FIG. 10 is a vertical view similar to FIG. 1, showing a modified form of universal valve system, with the valve assembly in the closed position and some of the parts shown in cross-section.
FIG. 11 is a fragmentary, vertical view of a portion of the system illustrated in FIG. 10, with the valve assembly in a partially open position.
FIG. 12 is a horizontal, sectional view taken on the line 12—12 in FIG. 10.
FIG. 13 is a horizontal, sectional view taken on the line 13—13 in FIG. 10.
FIG. 14 is a fragmentary vertical sectional view similar to FIG. 8, showing the same filling head used with the modified form of universal valve system.

Referring to FIG. 10, a retainer assembly 204 is positioned around the sealing member 150, and includes a ring-like retainer member 206 provided with an annular, internal groove 208, and which is held between an inner ring 210 and an outer ring 212 by machine screws 214.

A coiled spring 216 extends between the outer ring 212 and the end face 160 of the mounting ring 158, normally maintaining the internal groove 208 positioned away from the detent balls 156, whereby the latter remain in the groove 182. The internal diameter of the inner ring 210 is slightly less than the diameter of a circle defined by the outer surfaces of the ball detents, such that the inner ring 210 cannot move past the ball detents 156 when they are received in the groove 182 of the support member.

With the valve assembly 172 in the closed position (FIG. 10) and the keg filled with beer, for example, the O-ring 184 between the support member 180 and the sealing member 150 provides an effective seal between the interior and the exterior of the keg.

Also, the detent balls 156 which are supported in the openings 154, are received in the groove 182 of the support member 180 and thereby prevent the valve assembly from moving in either direction. And, even if the retainer assembly 204 were inadvertently actuated to release the ball detents 156, the residual gas pressure in the keg would maintain the valve assembly 172 in the closed position, and the split rings 202 on the inner ends of the guide pins 198 would engage the plate 166 and thereby prevent the valve assembly from being forced out of the keg by the residual gas pressure.

After the keg has been emptied of beer and in order to release the valve assembly 172 for movement to the open position for washing and filling as previously described, the retainer assembly 204 is moved inwardly by pressing on the outer ring 212 and compressing the spring 216, whereby the ball detents 156 can be cammed outwardly into the groove 208 by the side of the groove 182 as the support member 180 is pushed inwardly to the position shown generally in FIG. 11.

As the valve assembly 172 moves inwardly (FIG. 11), the guide pins 198 slide in the openings 200, the tubular connector 186 (FIG. 10) "telescopes" into the enlarged portion 170 of the siphon tube, and the O-ring 184 is in sliding engagement with the rods 164 . . . whereby the valve assembly 172 is prevented from twisting or canting, and is limited to a straight-line, axially movement. In the fully open position of the valve assembly, the flange 194 (FIG. 11) engages the disc 166.

The modified form of valve system illustrated in FIG. 10 — 13, utilizes a slightly modified form of beer filling pipe, which is shown in FIG. 14. Thus, the valve release block 110 is the same as in the first embodiment and functions in the same manner, but the upper end of the inlet portion 107 a of the beer filling pipe 106 is provided with an external groove 218 to receive an O-ring 220 for sealing engagement with the inner wall surface 152 of the sealing member 150.

Thus, it is apparent that there have been provided, two related forms of a universal valve system for beer kegs and the like, together with several forms of a filling assembly, which fullfill all of the objects and advantages sought therefor.

I claim:

1. In a keg or the like having side and end walls and an opening in one of said walls, a valve system mounted on said opening and comprising:
    a generally cylindrical housing having one end thereof supported at said opening and the other end extending into the interior of the keg;
    a sealing member adjacent said one end of the housing;
    a valve assembly including a valve body having a support member adjacent the outer end thereof, positioned in said housing for longitudinal movement between a closed position in which said support member is in sealing engagement with the sealing member and an open position in which the support member is spaced from the sealing member;
    a liquid passageway and a gas passageway in the valve body for communication between the interior and the exterior of the keg when the valve body is in the closed position, each of which passageways contains valve means;
    a plurality of openings in the housing within the interior of the keg, which openings are unobstructed to provide for the flow of liquid through the keg opening and the housing openings and into the interior of the keg when the valve body is in the open position; and
    locking detent means for releasably securing the valve assembly in the closed position and movable to an open position.

2. A valve system according to claim 1, in which the means for releasably securing the valve assembly in the closed position includes a detent member supported on one of the housing and the support member, and releasably engagable with the other.

3. A valve system according to claim 1, in which the means for releasably securing the valve assembly in the closed position includes at least one ball detent supported by said housing for engagement with at least one recess in said support member.

4. A valve system according to claim 1, in which said one end of the housing projects beyond the wall of the keg, and the means for releasably securing the valve assembly in the closed position includes:
    a plurality of circumferentially spaced openings in the projecting end of the housing;
    a plurality of ball detents supported in said openings; and
    an external, annular groove in the support member for receiving the ball detents.

5. A valve system according to claim 4, which further includes a retainer assembly positioned about the projecting end of the housing for releasably maintaining the ball detents in the annular groove when the valve assembly is in the closed position.

6. A valve system according to claim 4, which further includes an annular retainer member positioned about the projecting end of the housing and movable between a secured position in which the ball detents are maintained in the annular groove, and a released position in which the ball detents are free to move away from the groove; and means yieldably maintaining the retainer in the secured position.

7. A valve system according to claim 4, which further includes a retainer assembly positioned about the projecting end of the housing for releasably maintaining the ball detents in the annular groove when the valve assembly is in the closed position, said retainer assembly comprising:
    an annular retainer member having a projecting inner wall surface for engagement with the ball detents to maintain them in the groove in the support member and a recessed wall portion axially spaced from the projecting wall surface for receiving the ball detents when they move away from said groove;
    an inner ring member fastened to said retainer member and having an inner diameter which is less than the diameter of a circle defined by the outer surfaces of the ball detents when the latter are in the groove in the support member; and
    means yieldably biasing the retainer assembly toward the position in which the projecting inner wall surface of the retainer member is in engagement with the ball detents.

8. A valve system according to claim 4, which further includes:
    an annular retainer sleeve positioned on the projecting end of the housing and movable between a secured position in which the ball detents are maintained in the annular groove, and a released position in which the ball detents are free to move away from the groove;
    yieldable means biasing the retainer sleeve away from the keg wall and to the secured position; and
    means for maintaining the retainer sleeve on the projecting end of the housing.

9. A valve system according to claim 1, in which a first threaded ring is fastened in the opening in the wall of the keg and said one end of the housing contains a second threaded ring for mating engagement with said first threaded ring.

10. A valve system according to claim 1, in which the generally cylindrical housing includes a plurality of circumferentially spaced rods defining the outer periphery of the housing.

11. A valve system according to claim 1, in which the generally cylindrical housing includes:
    a plurality of circumferentially spaced rods having the outer ends thereof connected to the sealing member; and
    a plate having an opening adjacent the center thereof fastened to the inner ends of said rods, said opening receiving one end of a siphon tube in supporting relationship.

12. A valve system according to claim 1, in which:
    the generally cylindrical housing includes a plurality of circumferentially-spaced, axially-extending rods having the outer ends thereof supported adjacent the keg opening, and a plate fastened to the inner ends of said rods; and the valve assembly includes at least one axially-extending guide pin which has one end thereof fastened adjacent the valve body and the outer end in sliding engagement with an opening contained in said plate.

13. A valve system according to claim 1, in which:

the generally cylindrical housing includes a plurality of circumferentially-spaced, axially-extending rods having the outer ends thereof supported adjacent the keg opening, and a plate fastened to the inner ends of said rods; and the valve assembly includes two, diametrically opposed guides pins for guiding the movement of the valve assembly between the open position and the closed position, each pin having one end thereof fastened adjacent the value body and the other end projecting through an opening in the plate in sliding engagement therewith, and means on said other ends of the guide pins preventing the withdrawal thereof through the openings in the plate when the value assembly moves from the open to the closed position.

14. A valve system according to claim 12, which further includes: a fluid opening in the plate; a siphon tube having one end thereof connected to the plate at said fluid opening, the other end extending into the interior of the keg; and the valve assembly includes a tubular connector having one end thereof connected to the body member in communication with the liquid passageway, and the other end in telescoping, sealing engagement with said one end of the siphon tube.

15. A valve system according to claim 13, which further includes: a fluid opening adjacent the center of the plate; a siphon tube having one end thereof connected to the plate at said fluid opening, the other end extending into the interior of the keg; and the valve assembly includes a rigid tubular connector positioned between the guide pins and having one end thereof connected to the body member in communication with the liquid passageway, and the other end extending into said one end of the siphon tube in telescoping, sealing engagement therewith.

16. A valve system according to claim 12, in which the outer diameter of the support member of the valve assembly is substantially the same as the diameter of a circle defined by the inner surfaces of the rods of the housing; whereby the support member is guided by said rods when the valve assembly moves between the open position and the closed position.

17. A valve system according to claim 1, in which the housing includes an outer portion and a generally cylindrical inner portion with an inner wall surface, the valve body includes a generally cylindrical inner portion for sliding sealing engagement with said inner wall surface, the liquid passageway in the valve body is in communication with the interior of the inner portion of the housing, and a siphon tube within the keg has one end thereof in communication with the interior of the inner portion of the housing.

18. A valve system according to claim 1, in which the housing includes a generally cylindrical outer portion with a first inner wall surface and a generally cylindrical inner portion with a second inner wall surface, the valve body includes a generally cylindrical piston-like inner portion which supports an O-ring for sliding sealing engagement with said second inner wall surface when the valve assembly moves between the open and closed position, and said support member is in sliding supporting engagement with the first inner wall surface when the valve assembly moves between the open and closed positions.

19. A valve system according to claim 18, in which the inner housing portion is smaller in diameter than the diameter of the outer housing portion, and the outer portion contains the openings for the flow of liquid into the keg when the valve assembly is in the open position, said openings extruding from adjacent the wall of the keg to adjacent the inner portion of the housing.

20. A valve system according to claim 1, further including:

a liquid filling pipe having an upper end to be received in the keg opening in sealing relationship;

an air vent tube containing an air passageway mounted in said filling pipe and supported for axial movement relative thereto between an open position and a closed position;

a filling head on the upper end of the air vent tube for engagement with the valve assembly and containing a cavity in communication with the air passageway and constructed and arranged to be in communication with the liquid passageway in the valve assembly; and means for moving the locking detent means to the open position.

21. A valve system according to claim 20, in which the filling head contains means for opening the liquid valve means in the valve assembly when the air vent tube is moved to the open position.

22. A valve system according to claim 21, in which the filling head includes means for closing the upper end of the liquid filling pipe when the air vent tube is in the closed position.

* * * * *